United States Patent
Kolodziej et al.

(10) Patent No.: US 9,863,305 B1
(45) Date of Patent: Jan. 9, 2018

(54) LOW-COST HIGH-EFFICIENCY GDCI ENGINES FOR LOW OCTANE FUELS

(71) Applicant: Delphi Technologies, Inc., Troy, MI (US)

(72) Inventors: Christopher P. Kolodziej, Mosinee, WI (US); Mark C. Sellnau, Bloomfield Hills, MI (US)

(73) Assignee: DELPHI TECHNOLOGIES, INC., Troy, MI (US)

( * ) Notice: Subject to any disclaimer, the term of this patent is extended or adjusted under 35 U.S.C. 154(b) by 0 days.

(21) Appl. No.: 15/270,395

(22) Filed: Sep. 20, 2016

(51) Int. Cl.
| F02D 41/30 | (2006.01) |
| F02D 41/40 | (2006.01) |
| F02B 7/04 | (2006.01) |
| F02D 41/26 | (2006.01) |
| F02M 26/02 | (2016.01) |
| F02D 23/00 | (2006.01) |

(52) U.S. Cl.
CPC ............... F02B 7/04 (2013.01); F02D 41/26 (2013.01); F02D 41/3023 (2013.01); F02D 41/402 (2013.01); F02M 26/02 (2016.02); F02D 23/00 (2013.01); F02D 2041/3052 (2013.01)

(58) Field of Classification Search
CPC .. F02B 7/04; F02B 17/005; F02D 2041/3052; F02D 41/26; F02D 41/0025; F02D 41/3023; F02D 41/3029; F02D 41/3035; F02D 41/3041; F02D 41/401; F02D 41/402; F02D 19/08; F02D 19/085; F02D 19/0649; F02D 23/00; F02D 23/005; F02M 26/02; F02M 26/09
See application file for complete search history.

(56) References Cited

U.S. PATENT DOCUMENTS

| 2002/0007816 A1* | 1/2002 | Zur Loye | F02B 1/04 |
| | | | 123/295 |
| 2003/0089331 A1* | 5/2003 | Ueda | F02D 35/02 |
| | | | 123/295 |
| 2007/0095328 A1* | 5/2007 | Brehob | F02D 41/005 |
| | | | 123/406.47 |
| 2013/0213349 A1* | 8/2013 | Sellnau | F02B 23/101 |
| | | | 123/295 |
| 2015/0096531 A1* | 4/2015 | Zhou | F02D 41/064 |
| | | | 123/295 |
| 2015/0300280 A1* | 10/2015 | Zhou | F02D 41/3035 |
| | | | 123/435 |
| 2016/0369735 A1* | 12/2016 | Zhou | F01N 13/14 |

* cited by examiner

*Primary Examiner* — Lindsay Low
*Assistant Examiner* — George Jin
(74) *Attorney, Agent, or Firm* — Joshua M. Haines

(57) ABSTRACT

A GDCI engine has a piston arranged within a cylinder to provide a combustion chamber. According to one embodiment, the GDCI engine operates using a method that includes the steps of supplying a hydrocarbon fuel to the combustion chamber with a research octane number in the range of about 30-65. The hydrocarbon fuel is injected in completely stratified, multiple fuel injections before a start of combustion and supplying a naturally aspirated air charge to the combustion chamber.

19 Claims, 2 Drawing Sheets

LOW-COST HIGH-EFFICIENCY GDCI ENGINES FOR LOW OCTANE FUELS

STATEMENT REGARDING FEDERALLY SPONSORED RESEARCH OR DEVELOPMENT

This invention was made with government support under Contract No. DE-EE0006839 awarded by the Department of Energy. The government has certain rights in the invention.

BACKGROUND

This disclosure relates to an engine control system and method used of using a low octane fuel in a Gasoline Direct-Injection Compression-Ignition (GDCI) engine.

Gasoline Direct Injection Compression Ignition (GDCI) is an engine combustion concept that has demonstrated itself as a means to operate a compression-ignition engine on gasoline with significantly higher efficiency than gasoline spark-ignition engines and much lower engine-out emissions of particulate matter (PM) and oxides of nitrogen (NOx) than diesel compression-ignition engines. The combustion process of GDCI is uniquely different than for diesel compression ignition combustion systems in that the fuel is completely injected before the start of combustion, creating a partially premixed fuel-air mixture. This also means that control of the combustion is reliant on more than simply the start of main injection (as with diesel fuel).

Desired ignition and combustion phasing in GDCI is controlled by manipulations to the injection event(s) as well as the thermodynamic state of the engine cylinder contents (temperature, pressure, and chemical composition). To ensure fast response control of this thermodynamic state across a wide range of engine speeds and loads, the typical GDCI engine uses sophisticated valvetrain and boost systems. While these systems increase the power density and controllability of the engine, they also increase its cost. For some markets and applications, there could be a significant need for a low-cost high-efficiency version of GDCI which can operate on less processed low octane fuels.

SUMMARY

In one exemplary embodiment, a method of operating a gasoline direct injection compression ignition engine that has a piston arranged within a cylinder to provide a combustion chamber. The method includes the steps of supplying a hydrocarbon fuel to the combustion chamber with a research octane number in the range of about 30-65. The hydrocarbon fuel is injected in completely stratified, multiple fuel injections before a start of combustion and supplying a naturally aspirated air charge to the combustion chamber.

In a further embodiment of the above, the fraction of crude oil has a boiling point within a range of about 30-180° C.

In a further embodiment of the above, the stratified, multiple fuel injections achieve a non-homogenous fuel charge within which distinct equivalence ratios varying from higher in the center to lower at the outside exist over essentially the entire speed and load operating range of the engine.

In a further embodiment of the above, the peak combustion pressure in the combustion chamber is in a range of about 70-100 bar.

In a further embodiment of the above, the method includes the step of passing air through a charge air cooler before the combustion chamber to provide the naturally aspirated air charge.

In a further embodiment of the above, the method includes the step of passing exhaust gas from the combustion chamber to a catalytic converter.

In a further embodiment of the above, at least one valve passes the exhaust gas downstream from the catalytic converter to a location upstream from the combustion chamber.

In a further embodiment of the above, the method includes the step of regulating the supply of naturally aspirated air charge to the combustion chamber with fixed valve timing.

In another exemplary embodiment, a method of operating a gas direct injection compression ignition engine that has a piston arranged within a cylinder that is to provide a combustion chamber. The method includes the steps of supplying a hydrocarbon fuel to the combustion chamber that has a research octane number in the range of about 30-80. A fraction of crude oil has a boiling point within a range of about 30-180° C. The hydrocarbon fuel is injected in completely stratified, multiple fuel injections before a start of combustion.

In a further embodiment of any of the above, the stratified, multiple fuel injections achieve a non-homogenous fuel charge within which distinct equivalence ratios vary from higher in the center to lower at the outside exist over essentially the entire speed and load operating range of the engine.

In a further embodiment of any of the above, all of the stratified, multiple fuel injections for an engine cycle occur before top dead center over essentially the entire speed and load operating range of the engine.

In a further embodiment of any of the above, the method includes the step of providing a peak combustion pressure in the combustion chamber in a range of about 70-150 bar.

In a further embodiment of any of the above, the method includes the step of providing a naturally aspirated air charge to the combustion chamber. The peak combustion pressure in the combustion chamber is in a range of about 70-100 bar.

In a further embodiment of the above, the method includes the step of passing air through a charge air cooler before the combustion chamber to provide the naturally aspirated air charge.

In a further embodiment of the above, the method includes the step of passing exhaust gas from the combustion chamber to a catalytic converter.

In a further embodiment of the above, at least one valve passes the exhaust gas downstream from the catalytic converter to a location upstream from the combustion chamber.

In a further embodiment of the above, the method includes the step of regulating the supply of naturally aspirated air charge to the combustion chamber with fixed valve timing.

In a further embodiment of the above, the method includes the steps of supercharging air, supplying the supercharged air to a charge air cooler and passing cooled supercharged air to the combustion chamber.

In a further embodiment of the above, the method includes the step of bypassing a supercharger to provide uncompressed air to the charge air cooler.

In a further embodiment of the above, the method includes the step of supplying exhaust gas to an exhaust gas recirculation cooler, and supplying cooled exhaust gas to a supercharger inlet.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Given the increasing demands from automotive customers and government regulations, there is a strong need for the continuously evolving high power density Gasoline Direct-Injection Compression-Ignition (GDCI) engine. Such engines are being developed to precisely control the thermodynamic state of the engine using a wide variety of variably controllable components, which are used to adjust the reactivity of the air/fuel charge, for example. This disclosure recognizes a potential need in the marketplace for a simplified low-cost high-efficiency GDCI engine, potentially with limited load range, that can operate on the low-cost range of hydrocarbon fuels, such as naphtha or naphtha-blended fuels (referred to generally as "naphtha fuels" or "naphtha-based fuels").

Naphtha fuels typically have higher heating value and energy density than gasoline and are considered a "low $CO_2$" fuel. One example naphtha-based fuel that can be used by the disclosed GDCI engine has a research octane number (RON) in the range of about 30-80. The naphtha-based fuel has a fraction of crude oil with a boiling point within a range of about 30-180° C. The increased reactivity of naphtha fuels can compensate for the lack of complex engine controls in a GDCI engine if, for example, sufficient control of the start of combustion can be maintained.

Figure 1:
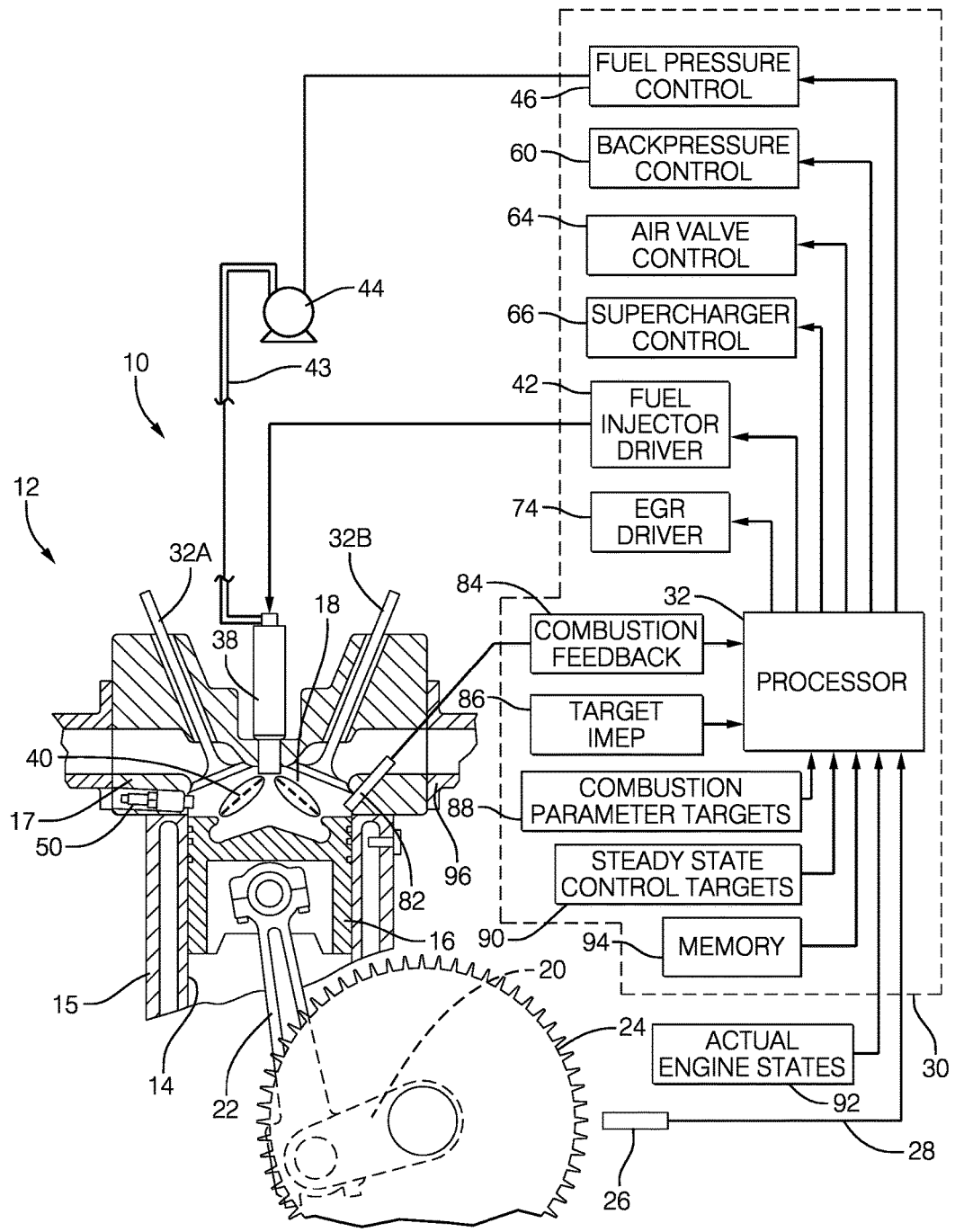
FIG. 1 is a schematic view of an embodiment of an engine control system suitable for controlling a Gasoline Direct-Injection Compression-Ignition (GDCI) engine.

FIG. 1 illustrates a non-limiting embodiment of an engine control system 10 suitable for controlling a Gasoline Direct-Injection Compression-Ignition (GDCI) internal combustion engine 12 for use in a vehicle, for example. GDCI differs from a Homogeneous Charge Compression Ignition (HCCI) in that the fuel/air mixture is intentionally non-homogeneous at the point of start of combustion (SOC) and employs a controlled distributed-equivalence-ratio mixture at SOC. That is, the fuel is stratified, providing discrete regions of equivalence-ratio, as disclosed in United States Publication No. 2013/0213349, which is incorporated herein by reference in its entirety.

The stratified, multiple fuel injections achieve a non-homogenous fuel charge within which distinct equivalence ratios varying from higher in the center to lower at the outside exist over essentially the entire speed and load operating range of the engine. This distributed-equivalence-ratio feature allows control of the fuel heat release timing and heat release rate as the combustion process progresses throughout the combustion chamber. Controllability of the heat release timing and rate allows GDCI to operate over essentially the entire speed and load range of the engine, which in turn may alleviate the need for mode switching and the associated efficiency losses. Although the exemplary embodiment relates to a GDCI engine, it should be understood that the disclosed engine control system and method can also be used for compression ignition diesel or HCCI engines.

While only a single cylinder is shown in FIG. 1, it will be appreciated that the disclosed system and method may be practiced independently on each cylinder of a multi-cylinder engine or commonly across multiple cylinders. The engine 12 is illustrated as having a cylinder bore 14 containing a piston 16, wherein the region above the piston 16 defines a combustion chamber 18. Linear movement of the piston 16 within the cylinder bore 14 rotationally drives a crankshaft 20 via a connecting rod 22. The engine 12 has a compression ratio of, for example, 9:1 to 14:1.

During engine operation it is desirable to determine the position of the piston 16 throughout its linear travel within the cylinder bore 14, for example, from bottom dead center (BDC) to top dead center (TDC). To this end, the system 10 may include a toothed crank wheel 24 and a crank sensor 26 positioned proximate to the crank wheel 24 to sense rotational movement of the crank wheel teeth. The crank sensor 26 outputs a crank signal 28 to a controller 30 indicative of a crank angle θ, which corresponds to the linear position of the piston 16, and a crank speed N.

In the disclosed GDCI engine, all of the stratified, multiple fuel injections for an engine cycle occur before top dead center over essentially the entire speed and load operating range of the engine, and peak combustion pressure occurs after TDC following combustion. In one example, the peak combustion pressure in the combustion chamber in a range of about 70-150 bar. For a naturally aspirated engine, the peak combustion pressure in the combustion chamber is in a range of about 70-100 bar.

The controller 30, such as an engine control module (ECM), may include a processor 32 or other control circuitry as should be evident to those in the art. The controller 30 and/or processor 32 may include memory 94, including non-volatile memory, such as electrically erasable programmable read-only memory (EEPROM) for storing one or more routines, thresholds and captured data. The one or more routines may be executed by the processor 32 to perform steps for determining a prior engine control parameter and scheduling a future engine control signal such that a future engine control parameter corresponds to a desired engine control parameter. FIG. 1 illustrates the processor 32 and other functional blocks as being part of the controller 30. However, it will be appreciated that it is not required that the processor 32 and other functional blocks be assembled within a single housing, and that they may be distributed about the engine 12 or vehicle. Signals to and from the controller 30 are indicated by solid arrowed lines in the figures.

One or more intake valves 32A and exhaust valves 32B are driven by one or more camshafts to regulate the flow of air into and exhaust from the combustion chamber 18. In the example, the engine 12 has fixed camshaft timing, but variable camshaft timing may also be used.

A fuel injector 38 is configured to dispense fuel 40 in accordance with an injector control signal from an injector driver 42. Example fuels include naphtha, kerosene, diesel, or gasoline; however, other fuels may be used. The fuel injector 30 controls delivery of fuel 40 to the combustion chamber 18 from a fuel pump 44 via a fuel pressure rail 43 and a fuel spill valve, for example, controlled by a fuel pressure control 46.

Desired operation of a GDCI engine relies upon achieving a distribution of desired fuel/air ratio, or equivalence ratio φ, unlike typical internal combustion engines. Unlike typical internal combustion engines, a GDCI engine controls in-cylinder conditions to achieve autoignition of the fuel, rather than relying on external ignition sources such as a spark plug or a glow plug. Unlike typical diesel engines which utilize locally rich combustion via a diffusion flame, GDCI utilizes a progressive autoignition process of a distribution of equivalence ratios varying from lean to slightly rich at the moment of start of combustion. The fuel injection profile of a GDCI engine includes one or more injection events intended to deliver partially premixed fuel to the combustion chamber 18, rather than a homogenous air/fuel mixture as is done in Homogeneous Charge Compression Ignition (HCCI) engines, for example.

Controllable aspects of the fuel injection profile may include how quickly or slowly the fuel injector 38 is turned on and/or turned off, a fuel rate of fuel 40 dispensed by the fuel injector 38 while the fuel injector 38 is on, the initiation timing and duration of one or more fuel injections as a function of engine crank angle θ, the number of fuel injections dispensed to achieve a combustion event, and/or the pressure at which fuel is supplied to the fuel injector 38 by the fuel pump 44. Varying one or more of these aspects of the fuel injection profile may be effective to control autoignition. The engine 12 may also be equipped with an ignition source such as a spark plug 50 to assist with initial engine starting, if desired.

In order to achieve autoignition of the air/fuel mixture over essentially the entire speed-load range of the engine while achieving exceptional fuel consumption, noise, and emissions results, a multiple late-injection, partially premixed, low-temperature combustion process is used. Fuel 40 is injected by the fuel injector 38, where the fuel injector is fed by a fuel rail at a pressure in the range of 50 to 500 bar, late on the compression stroke using a number of distinct injection events to produce a certain state of controlled air/fuel mixture in the combustion chamber 18. The state of stratification in the combustion chamber 18 along with cylinder air charge properties controls the time at which autoignition occurs and the rate at which it proceeds. Depending on engine speed and load, single-injection, double-injection, triple-injection, quadruple-injection, quintuple-injection, or higher order strategies may be used. Fuel may be injected late on the compression stroke and generally in the range of 100 crank angle degrees before top dead center to 10 crank angle degrees after top dead center under most operating conditions, but other conditions may require injection timing outside this range.

The engine control system 10 includes one or more engine control devices operable to control an engine control parameter in response to an engine control signal, wherein the engine control parameter influences when autoignition initiates and the rate at which autoignition propagates through the combustion chamber 18. Aspects of the engine control system 10 will be more fully understood with reference to engine flow paths, shown in FIGS. 2-4.

Figure 2:
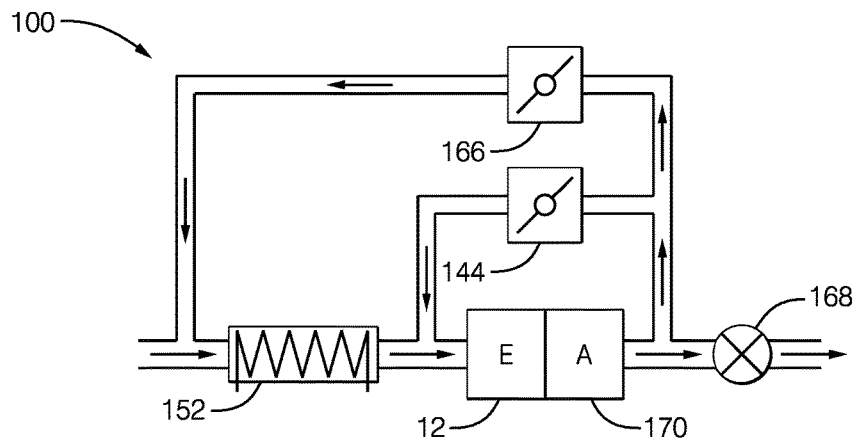
FIG. 2 is a schematic view of one embodiment of the engine control system shown in FIG. 1.

FIG. 2 is a schematic view of a non-limiting embodiment of a control system 100 for the engine 12 in FIG. 1. More (e.g., FIGS. 3 and 4) or fewer components than shown may be used, and the gas paths may be configured differently than illustrated. The engine 12 lacks a boosting system, intake air heating or internal exhaust rebreathe, as is used in some more complex GDCI engines.

With continuing reference to FIG. 2, air passes through a charge air cooler 152 before entering the engine 12 to provide naturally aspirated air induction. Following a combustion event, exhaust gas exits the engine 12 and passes through a catalytic converter 170. Upon exiting the catalytic converter 170, the exhaust gas can follow one of several paths. A portion of the exhaust gas may pass through an EGR valve 166 that is controlled by an EGR driver 74 (FIG. 1), to be reintroduced into the intake air upstream from the charge air cooler 152. A portion of the exhaust gas may flow through a bypass valve 144 to bypass the charge air cooler 152 and enter the engine 12. Up to 20% additional EGR, for example, is used to maintain combustion phasing as compared to a gasoline GDCI engine. The remainder of the exhaust gas that is not recirculated through the EGR system passes through a backpressure valve 168, which is in communication with a backpressure control 60 (FIG. 1), and a muffler, to be exhausted out a tail pipe.

Figure 3:
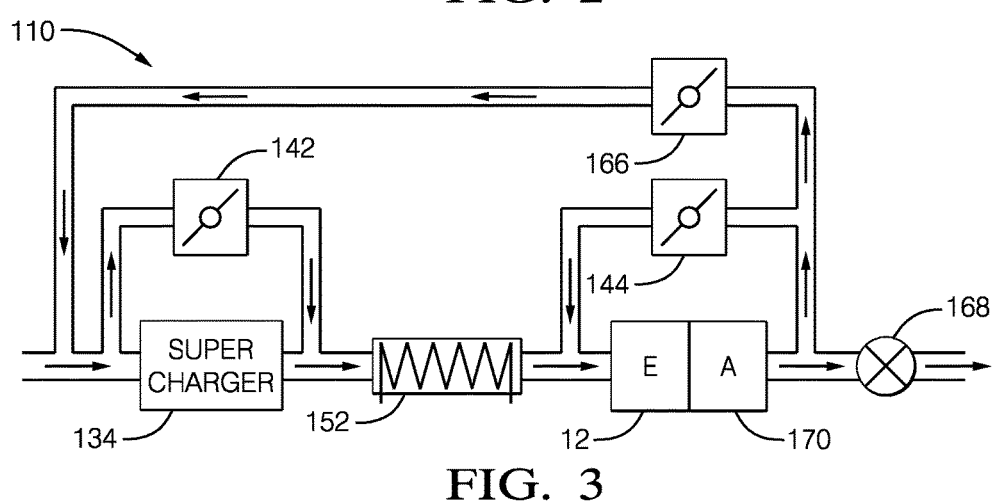
FIG. 3 is a schematic view of another embodiment of the engine control system shown in FIG. 1.

Another engine control system 110 is shown in FIG. 3. The system 110 is similar to that shown in FIG. 2, but includes a supercharger 134 controllable with a supercharger control 66 (FIG. 1). Air is channeled to the supercharger 134 before entering the charge air cooler 152. A controllable supercharger bypass valve 142 allows air to bypass the supercharger 134.

Figure 4:
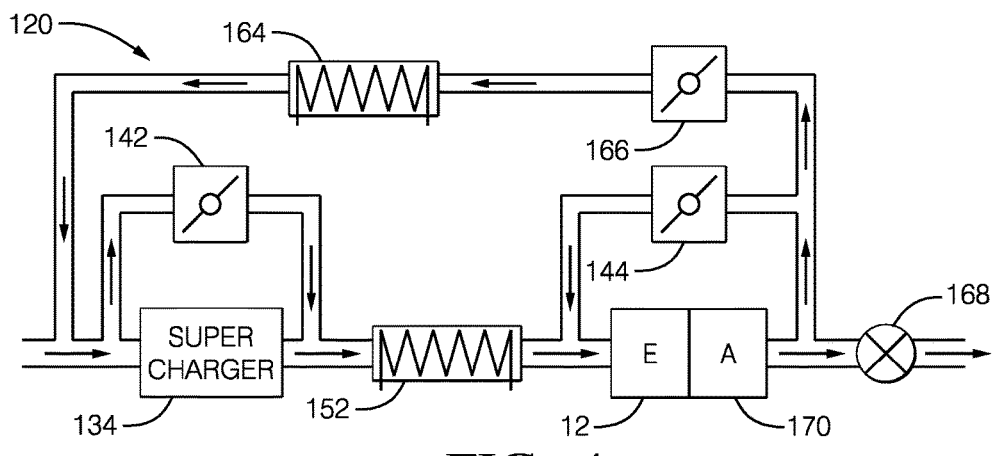
FIG. 4 is a schematic view of yet another embodiment of the engine control system shown in FIG. 1.

Referring to FIG. 4, an engine control system 120 is shown that is similar to that of FIG. 3. An EGR cooler 164 is provided between the EGR valve 166 and the inlet to the supercharger 134. Again, it should be understood more or fewer components than shown may be used, and the gas paths may be configured differently than illustrated.

The engine 12 and control systems 100, 110, 120 can be used for any suitable application, including as range extenders in hybrid vehicles.

Returning to FIG. 1, the engine control system 10 includes a combustion sensing device 82, such as a pressure sensor, arranged in the combustion chamber 18. The combustion sensing device 82 provides a signal to a combustion feedback module 84 that is indicative of in-cylinder conditions within the combustion chamber 18, such combustion characteristics and/or pre-combustion conditions. Another example combustion sensing device 82 detects heat release. Other devices that may be useful for indicating some aspect of the combustion process are a knock sensor or an ion sensor. The combustion detection device 82 may be any one of the exemplary sensors, other suitable sensor, or a combination of two or more sensors arranged to provide an indication of in-cylinder conditions.

The controller 30 has other modules relating to desired engine operation, including target Indicated Mean Effective Pressure (IMEP) 86, combustion parameter targets 88, and steady state control targets 90, which may be organized in steady state calibration tables stored in memory. Combustion parameter targets 88 may correspond to empirically determined values relating to the combustion process within the combustion chamber 18 during various engine operating conditions. Although not shown, the engine control system 10 may include additional sensors or estimators to determine temperature and/or pressure and/or oxygen concentration (for example, in-cylinder conditions within the combustion chamber 18) and/or humidity at locations within the air intake system and/or the engine exhaust system, which may be provided as actual engine states 92.

At its simplest form, a low-cost naphtha engine is able to operate without the complex systems mentioned, with the exception of a cooled EGR system. The base low-cost naphtha GDCI engine is able to operate with atmospheric pressure (naturally aspirated, no boost) from idle to max load. It should be noted that without a boost system, power density would be reduced by half for current compression ratio and performance and emissions targets. But full engine power could be increased by adding displacement. Being that increased intake air temperature, boost, and exhaust rebreathe is not required at low loads for stable engine operation with naphtha fuels, these systems would not be required. This means that the required thermodynamic state of the cylinder contents would change much less from low to high load, simplifying engine control. In addition to having reduced engine systems complexity, control, and cost, such a naphtha GDCI engine would still be very efficient.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A method of operating a gasoline direct injection compression ignition engine having a piston arranged within a cylinder to provide a combustion chamber, the method comprising the steps of:
   supplying a hydrocarbon fuel to the combustion chamber with a research octane number in the range of about 30-65;
   wherein the hydrocarbon fuel has a fraction of crude oil with a boiling point within a range of about 30-180 Celsius;
   injecting the hydrocarbon fuel in completely stratified, multiple fuel injections before a start of combustion; and
   supplying a naturally aspirated air charge to the combustion chamber.

2. The method according to claim 1, wherein the stratified, multiple fuel injections achieve a non-homogenous fuel charge within which distinct equivalence ratios varying from higher in the center to lower at the outside exist over essentially the entire speed and load operating range of the engine.

3. The method according to claim 1, wherein a peak combustion pressure in the combustion chamber is in a range of about 70-100 bar.

4. The method according to claim 3, comprising a step of passing air through a charge air cooler before the combustion chamber to provide the naturally aspirated aircharge.

5. The method according to claim 4, comprising a step of passing exhaust gas from the combustion chamber to a catalytic converter.

6. The method according to claim 5, comprising at least one valve passing the exhaust gas downstream from the catalytic converter to a location upstream from the combustion chamber.

7. The method according to claim 6, comprising a step of regulating the supply of naturally aspirated air charge to the combustion chamber with fixed valve timing.

8. A method of operating a gasoline direct injection compression ignition engine having a piston arranged within a cylinder to provide a combustion chamber, the method comprising the steps of:
   supplying a hydrocarbon fuel to the combustion chamber and having the following properties:
   a) a research octane number in the range of about 30-65;
   b) a fraction of crude oil having a boiling point within a range of about 30-180° C.; and
   injecting the hydrocarbon fuel in completely stratified, multiple fuel injections before a start of combustion.

9. The method according to claim 8, wherein the stratified, multiple fuel injections achieve a non-homogenous fuel charge within which distinct equivalence ratios varying from higher in the center to lower at the outside exist over essentially the entire speed and load operating range of the engine.

10. The method according to claim 9, wherein all of the stratified, multiple fuel injections for an engine cycle occur before top dead center over essentially the entire speed and load operating range of the engine.

11. The method according to claim 8, comprising a step of providing a peak combustion pressure in the combustion chamber in a range of about 70-150 bar.

12. The method according to claim 11, comprising a step of providing a naturally aspirated air charge to the combustion chamber, wherein the peak combustion pressure in the combustion chamber is in a range of about 70-100 bar.

13. The method according to claim 11, comprising a step of passing air through a charge air cooler before the combustion chamber to provide a naturally aspirated air charge to the combustion chamber.

14. The method according to claim 13, comprising a step of passing exhaust gas from the combustion chamber to a catalytic converter.

15. The method according to claim 14, comprising at least one valve passing the exhaust gas downstream from the catalytic converter to a location upstream from the combustion chamber.

16. The method according to claim 15, comprising a step of regulating the supply of naturally aspirated air charge to the combustion chamber with fixed valve timing.

17. The method according to claim 8, comprising a step of supercharging air, supplying the supercharged air to a charge air cooler and passing cooled supercharged air to the combustion chamber.

18. The method according to claim 17, comprising a step of bypassing a supercharger to provide uncompressed air to the charge air cooler.

19. The method according to claim 17, comprising a step of supplying exhaust gas to an exhaust gas recirculation cooler, and supplying cooled exhaust gas to a supercharger inlet.

* * * * *